Figure 1:
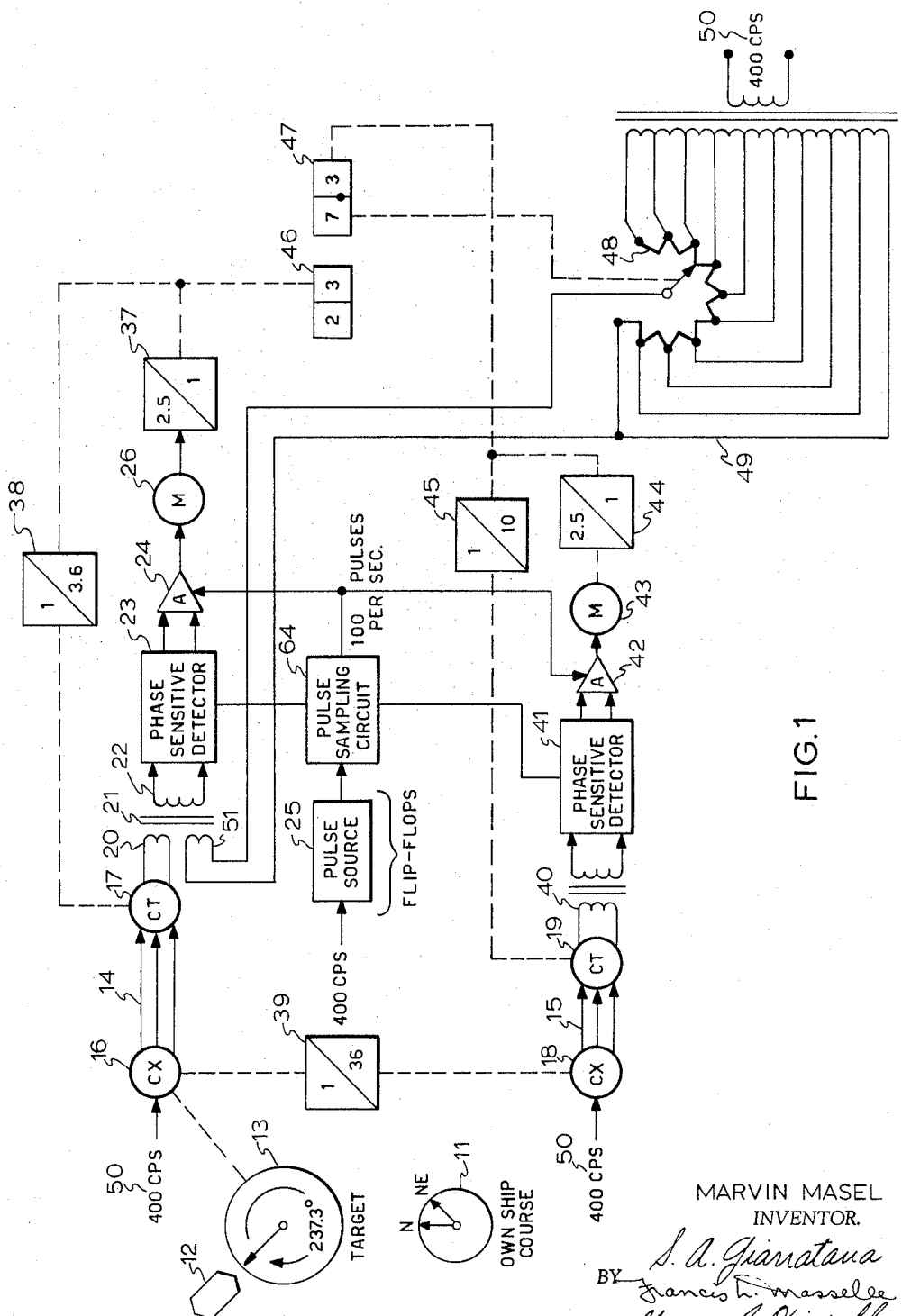

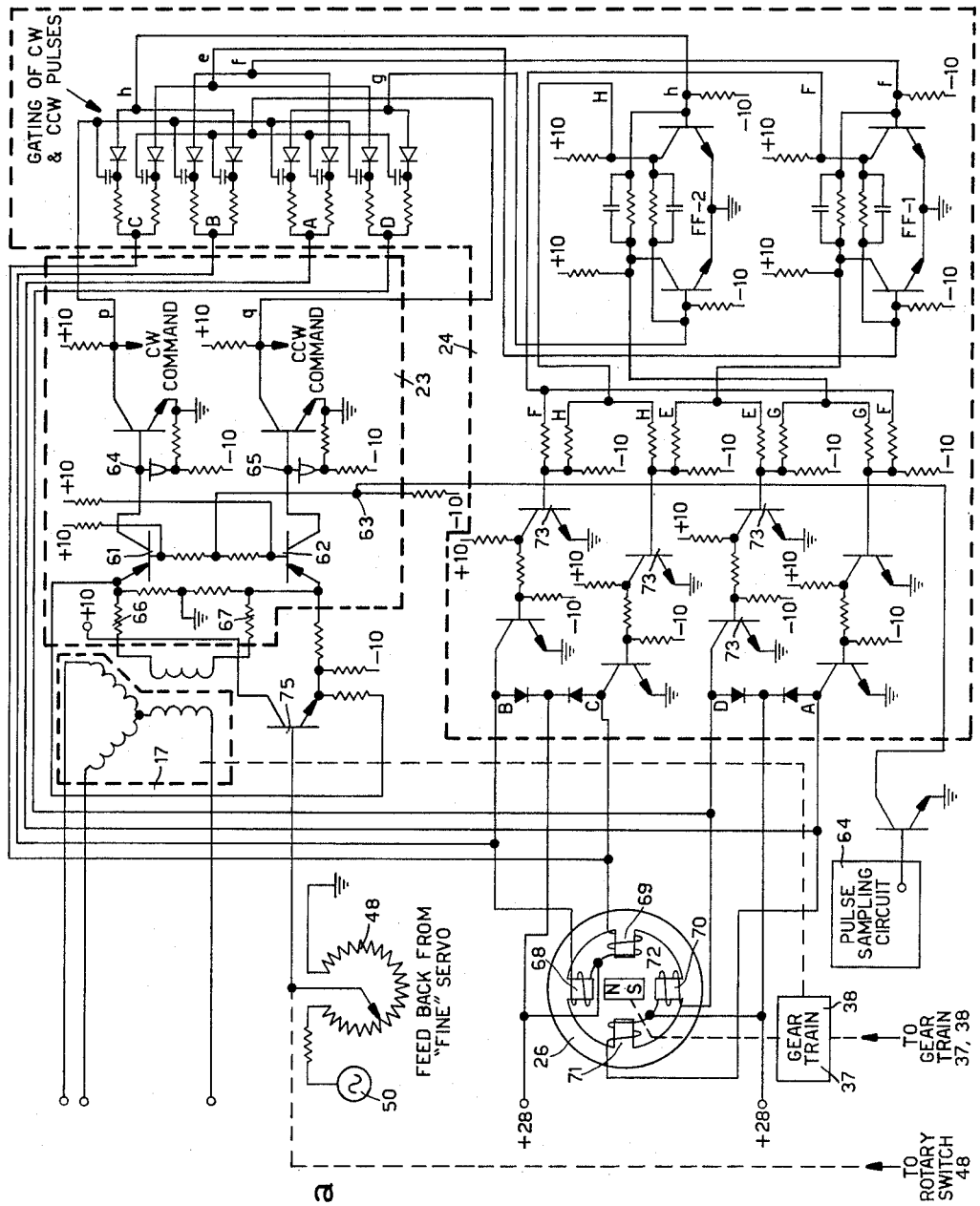

Nov. 9, 1965 M. MASEL 3,217,318
ANGLE INDICATOR OR ENCODER
Filed Nov. 29, 1962 3 Sheets-Sheet 3

MARVIN MASEL
INVENTOR.

BY

ATTORNEYS

Patented Nov. 9, 1965

3,217,318
ANGLE INDICATOR OR ENCODER
Marvin Masel, West Englewood, N.J., assignor to General Precision Inc., Little Falls, N.J., a corporation of Delaware
Filed Nov. 29, 1962, Ser. No. 240,850
4 Claims. (Cl. 340—347)

The present invention relates to an angle indicator or encoder, and more particularly to the type of angle counter used on submarines to indicate bearing and speed.

It is well known that one type of arrangement known as a synchro arrangement used to indicate angle deviation consists of the combination of a control transmitter, usually abbreviated CX, and a control transformer, usually abbreviated CT. In the conventional embodiment of this arrangement, the CX has a coil primary and a Y-shaped secondary, whereas, the CT will have the reverse configuration, i.e., a Y-shaped primary and a coil secondary. The arrangement operates on the null principle. As long as the CX is so disposed that no output current flows through the Y-shaped secondary, nothing happens in the CT. If however the CX primary rotates with respect to the secondary, an error signal output flows from the CX secondary to the CT. This in turn, through circuitry known in the art, causes the CT secondary or its associated components to turn so that the output therefrom will be equal to the output from the CX. Essentially this is an arrangement where the second component follows the path of the first component to provide an output from the second component which will balance the output from the first component so as to provide a null. In the customary arrangement, at least two synchros are used, one is usually referred to as the coarse synchro and the other as the fine synchro. The fine synchro provides a vernier within the angle determined by the coarse synchro. The conventional two speed synchro system is so arranged that the coarse synchro is first driven to an approximate null and then the fine synchro is driven to a more exact null by the same motor.

The present invention is directed to an arrangement for reducing the amount of rotation required of the counter input and to reducing the slewing time.

In the present invention, there are two stepper motor driven servos, one driving the coarse CT and counter, and the other driving the fine CT and counter. For a maximum slewing time of one second, 60 c.p.s. pulses are used to drive the fine stepper motor in the direction of the minor arc. Slewing speed is further reduced to one-half second or less by driving the stepper motor with 100 c.p.s. pulses by using a 400 c.p.s. A.-C. source. Some of the features of the invention insure that all counter numerals are properly centered, and, ambiguity is further avoided by a feedback arrangement from the most significant value of the fine counter to the coarse synchro arrangement.

Figure 2B:
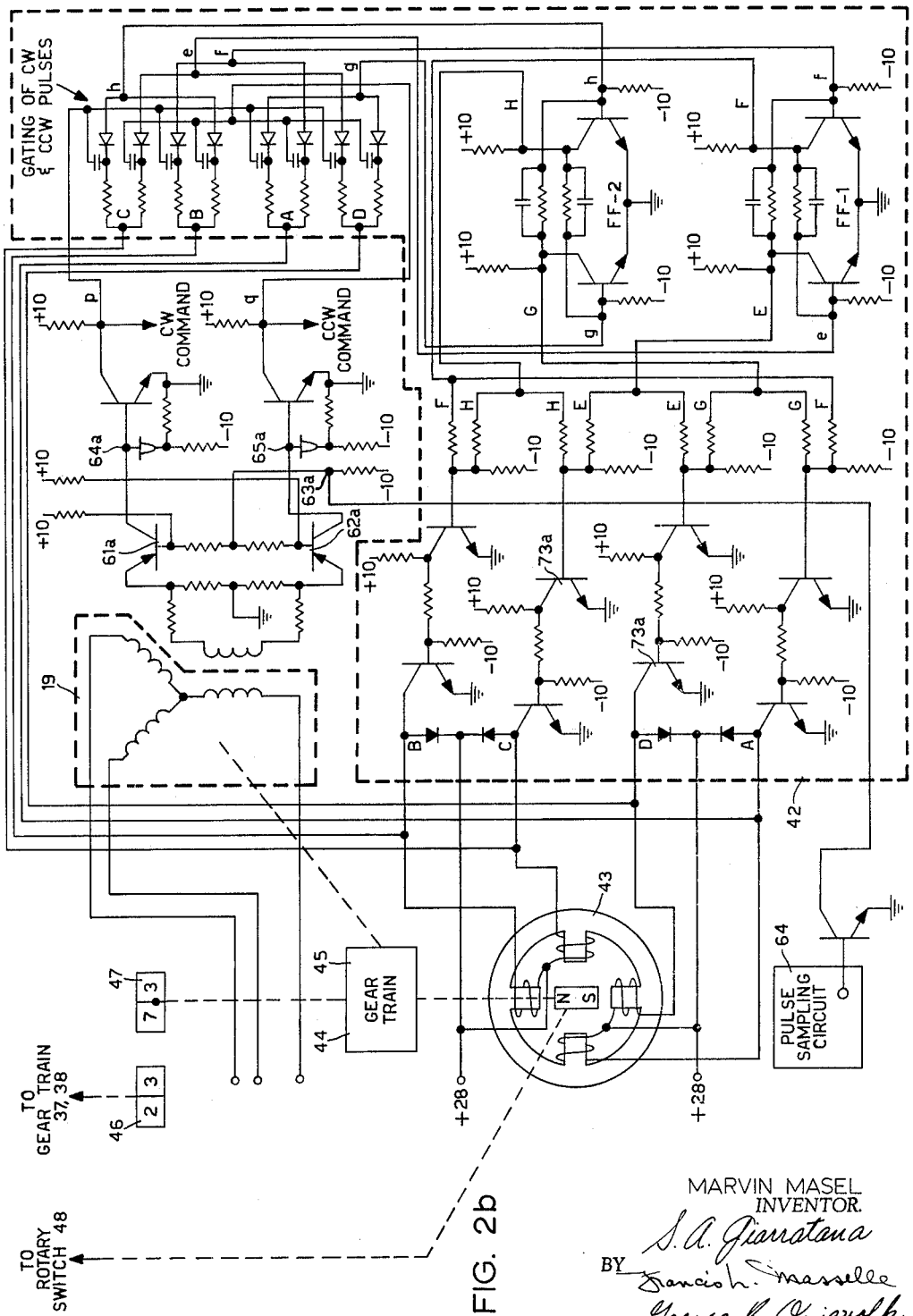

Other objects and advantages of the present invention will become readily apparent from the following description of the invention and the accompanying drawing, in which:

FIGURE 1 is a block diagram explanation of the coarse and fine synchro arrangement contemplated herein; and, FIGS. 2a and 2b are a schematic explanation of the circuitry used in the embodiment of FIGURE 1.

In the drawing, a submarine compass 11 gives the ship's course as traveling exactly NE. By means known in the art, e.g., by the periscope or sonar, a target 12 has been detected, and happens to be located at an azimuth of 237.3° from the submarine's course. The target bearing must now be supplied from the target indicator 13. The submarine is provided with coarse and fine synchro pairs 14 and 15. Coarse synchro pair 14 includes a CX 16 and a CT 17. The CX 16 will rotate as the target indicator 13 is pointed in the direction of the target. But, to understand the operation of the fine synchro and its integration into the coarse synchro, it is first necessary to understand the operation of the coarse synchro. The coarse synchro pair can be driven to 36 discrete positions from 0 through 35. As the CX 16 turns it supplies a signal to CT 17, which in turn supplies a signal to a primary 20 of transformer 21 having a secondary 22 coupled to a phase sensitive detector 23. Phase sensitive detector will sense the polarity of the difference in output between the CX and CT. The signal from phase sensitive detector 23 will be fed to a pulsing amplifier 24 which receives 100 pulses per second from a pulse source 25, depending on the signal from the phase sensitive detector, these pulses in turn are fed to a bi-directional stepper motor 26 in one or the other direction. Bi-directional stepper motor in turn operates gear trains 37 and 38 which servos back to CT 17 so as to drive the CT to a null position. Bi-directional stepper motor 26 moves in 90° steps, and if each step is to indicate one coarse position of 10°, a 9 to 1 ratio is required. This is accomplished in practice by having a first gear train 37 reducing the rotational angle from the stepper motor by 2.5 to 1 so that each step is then 36°, and a second gear train 38 reduces this output by a ratio of 3.6 to 1 so that the output is effectively 10° per step.

Coupled to CX 16 is a mechanical gear train 39 having a ratio of 1 to 36 which turns CX 18 at 36 times the speed of CX 16. CT 19 which receives the output from CX 18 is driven to one of 100 discrete positions, each position being separated from the next position by 360/100 or 3.6°. The output from CT 19 is fed to a phase sensitive detector 41 similar to phase sensitive detector 23, and from phase sensitive detector 41 to a pulsing amplifier 42 likewise receiving 100 pulses per second from pulse source 25. These pulses are supplied in proper phase by the amplifier to the bi-directional stepper motor 43 having 90° steps. The output from motor 43 is recycled back to CT 19 and since there are 100 discrete positions as hereinbefore pointed out, each 90° step of the stepper motor must move the CT 3.6°. This is accomplished by a first reduction gear train 44 having a ratio of 2.5 to 1 and a second gear train 45 having a reduction of 10 to 1. The output from the coarse gear trains 37 and 38 are read out in a first counter 46 going from 0 to 35 whereas the output from the fine gear trains 44 and 45 are read out in a second counter 47 going from 0 to 99.

Interrelation between the coarse and fine digits is carried out by having the mechanical arrangement operating the second counter 47 mechanically rotate the wiper arm of a pot 48 to an electrical resistance value which will correspond to the most significant fine digit. As illustrated in the drawing, the counter readout shows a value of "273.5°" and the most significant digit of the fine counter is mechanically rotating the wiper arm of pot 48 to the value position corresponding to 7. Pot 48 is coupled by a circuit 49 to the secondary 22 of coarse transformer 21 by subtraction means 51, depicted in FIGURE 1 as a coil. The two CX's and the pot 48 all receive the same 400 c.p.s. input so that the value of pot 48, because of the direction of the windings is effectively subtracted from the output from secondary 22 of the coarse synchro. In this way, the value shown as a combination of the coarse and fine counters will be (23) (7.3) and not (24) (7.3).

The operation of the device is shown is greater detail in the illustration given in FIGS. 2a and 2b. For convenience, the individual components for the fine and coarse synchro are similarly numbered, i.e., the coarse synchro components are numbered as transistors 61, 62, pulse sampling circuit 63, etc.; whereas the corresponding components in the fine synchro are numbered 61a, 62a, 63a, etc. As the operation of the fine synchro generally follows that of the coarse synchro, only a detailed operation of the coarse synchro needs to be given. In FIGS. 2a and 2b there is shown a portion of the Y-shaped control transformer, i.e., CT 17 feeding the input error signal into the secondary side and from there into the phase sensitive detector 23. This unit includes two PNP transistors which are so disposed that they are responsive to the output 63 from the pulse sampling circuit 64 going to the bases of the transistors. Pulse sampling network 64 is known in the art and feeds sample pulses of the input 50 to the bases of the transistors so as to permit only a signal in proper phase to be sent by the transistors. The signal from the transistors is sent to tunnel diodes 64 and 65. The tunnel diodes normally are non-conducting. If the synchro error voltage at the instant of sampling is sufficient to cause the peak current of about 1 mil of one tunnel diode to be exceeded, the tunnel diode will flip to the high voltage drop state of about one-half volt and pass the signal from its transistor. The transistor is then turned off at the expiration of the sampling interval. By using the proper series resistors 66 and 67 at the output of CT 17, the dead zone may be specified at will. This insures that the values, which will be seen in the counters will represent a significant value. Otherwise, there is a tendency for the least significant digit in the counter, and in this case, being a coarse value it would be a value in the "ten" box, to waver up and back between two values because of small changes in the CT output. Only one transistor can be turned on during the sampling interval, while the other transistor is driven into cut-off. The temperature coefficient of the tunnel diode peak current is small enough that the selected dead zone is stable.

Looking now at the stepper motor 26, it will be observed that there are four poles, 68, 69, 70, 71. In order to turn the rotor 72, in the proper direction it is necessary for the amplifier to remember the last position of the rotor and to give the proper signal in the proper phase so as to turn the rotor in the proper direction. This is accomplished by a conventional arrangement in amplifier 24 wherein the output signals from the tunnel diodes 64 and 65 providing the clockwise and counter-clockwise commands go to four legs A, B, C, D, which energize the four poles 68, 69, 70, 71. The tunnel diodes are coupled to a gating circuit providing outputs e, f, g, h, to two flip-flops FF-1 and FF-2 which remember the last rotor signal and position. The flip-flops in turn have outputs E, F, G, H, to the transistor amplifiers 73 coupled to legs A, B, C, D. The clockwise command or counter-clockwise command pulses are gated to the appropriate flip-flop base depending on which coil of the stepper motor is energized. Only one coil of the stepper motor may be energized at any one time instant. Diodes are used in shunting the motor coils to eliminate inductive transients, reduce radio noise interference and to protect the motor drive transitsors. A resistance for each stepper motor coil of 150 ohms is selected so that the power dissipation for each stepper motor is about 5 watts.

The foregoing circuitry is the same for the coarse and fine synchros except that the resistors to make a proper dead zone are different. As already explained, and shown in block diagram in FIGURE 1, gear trains are provided from the stepper motor to the counter and in a feedback loop to the CT. The subtraction network shown generally in FIGURE 1 as a pot 48 in circuit 49 and a subtraction coil 51, in practice will include an input 50 from the A.-C. source to the pot 48. Actual subtraction is preferably not performed by a coil 51 as shown in FIGURE 1 merely to illustrate the theoretical principles, but by an NPN transistor 75 coupled to the emitters of transistors 61 and 62, subtracting the value supplied by these transistors to tunnel diodes 64 and 65.

To avoid jitter of the counter the coarse servo should have a dead zone of 2° or 3° of the error signal and the fine servo should have a dead zone of somewhat more than .05°. Assuming a dead zone set at .065° ± .01°, at worst, an angle of 237.225° will be indicated as 237.3° rather than 237.2°. In practice, the synchro error signal will be sampled once every 4 cycles with a 400 cycle source and once each cycle with a 60 cycle source. This sampling of the synchro error signal is made in the vicinity of the 90° phase angle and lasts several micro seconds. To ensure that all counter numerals are properly centered, magnetic detents are provided in the stepper motors.

It is to be observed therefore that the present invention provides for an angle indicator which comprises in combination, coarse and fine synchro servo loops including control transmitters, control transformers sensing the signal from said control transmitters, stepper motors responsive to said sensed signal, and mechanical means coupled to said stepper motors turning said control transformers to a null position with respect to said sensed signal; counter means responsive to said stepper motors providing coarse and fine digital values of the angle required to return said control transformers to a null position; and subtraction means between said fine stepper motors and said coarse servo loop to subtract a significant fine value from the coarse sensed signal.

The subtraction means include a pot having a wiper arm rotated by said fine servo motor an amount corresponding to said significant fine value and power supply coupling means in a circuit with said pot and said coarse servo loop so coupled as to subtract said fine value. The device includes phase sensitive detector means coupled to the output of the control transformers to provide a signal in proper phase to said stepper motor including a pulse sampling network, a pair of transistors responsive to the output from said pulse sampling network, and tunnel diodes responsive to the output of said transistors. The tunnel diodes are normally non-conducting, passing only a signal exceeding a predetermined value. Resistor means in the control transformer output circuit fix said predetermined value. The subtraction means include a pot having a wiper arm rotated by the fine stepper motor an amount corresponding to a significant fine value and power supply coupling means in a circuit with said pot and said coarse servo loop coupled so as to subtract said fine value. This power supply coupling means includes a third transistor so coupled to each transistor in said pair of transistors as to subtract the value of the power supplied across the pot. The stepper motor has a rotor and a four pole stator to move the rotor in 90° steps. A pulsing amplifier network coupled to said phase sensitive detector means having first and second flip-flops passes pulses in proper phases to one of said four poles at a time.

It will be apparent to those skilled in the art, that the present invention is not limited to the specific details described above and shown in the drawings, and that various modifications are possible in carrying out the features of the invention and operation, actuation and method of control and utilization thereof, without departing from the spirit and scope of the appended claims.

I claim:

1. An angle indicator, comprising in combination, coarse and fine synchro electrical servo loop circuits, each loop circuit including, a control transmitter; a control transformer with input and output side sensing on the input side the signal from the control transmitter and producing on the output side a signal corresponding to said sensed signal; phase sensitive detector means connected to the output side of said control transformer including therein, a pair of transistors each so disposed as to pass current of only the one or the other phase, said transistors each having base electrodes controlling the passing of current and output electrodes, a pulse sampling network feeding pulses to said base electrodes, a tunnel diode connected to each of said output electrodes, said tunnel diodes being normally non-conducting, passing only a signal exceeding a predetermined value, resistor means connected to said control transformer output side fixing said predetermined value; amplifier means connected to said tunnel diodes; a stepper motor acted on by said amplifier means, said stepper motor receiving through said amplifier means current in the proper phase; mechanical means between said stepper motor and said control transformer, turning said control transformer to a null position with respect to said sensed signal; separate counter means responsive to the stepper motors of each circuit loop providing coarse and fine digital values of the angle required in each circuit loop to return said control transformer to a null position and potentiometer subtraction means responsive to said fine circuit loop stepper motor and extending to one of the components which is located in said coarse circuit loop for subtracting a significant fine electrical value from the coarse sensed signal.

2. A device as claimed in claim 1, said potentiometer subtraction means including a potentiometer having a wiper arm rotated by said fine stepper motor an amount corresponding to said significant fine value and power supply coupling means in a circuit with said potentiometer and said coarse servo loop so coupled as to subtract said fine value.

3. A device as claimed in claim 2, said power supply coupling means including a third transistor coupled to each transistor in said pair of transistors so as to subtract the value of the power supplied across said potentiometer therefrom.

4. A device as claimed in claim 2, said stepper motor having a rotor and four pole stator to move the rotor in 90° steps, and said amplifier means being a pulsing amplifier network coupled to said phase sensitive detector means with first and second flip-flops passing pulses in proper phase to one of said four poles at a time.

References Cited by the Examiner
UNITED STATES PATENTS
3,045,230   7/62   Tripp et al. _____ 340—347

MALCOLM A. MORRISON, *Primary Examiner.*